June 27, 1961      D. M. PHILLIPS      2,990,151
SUPPORT FOR ELECTRICAL DEVICES
Filed Nov. 4, 1960      3 Sheets-Sheet 1
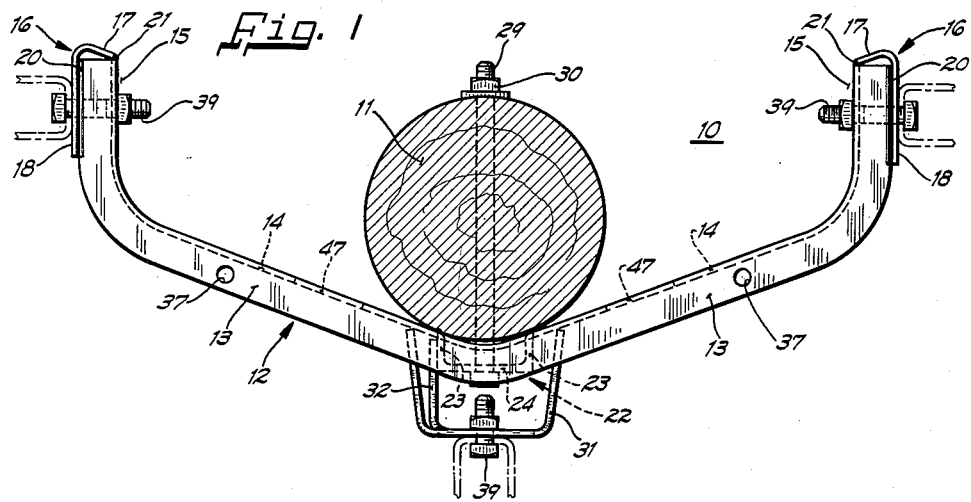
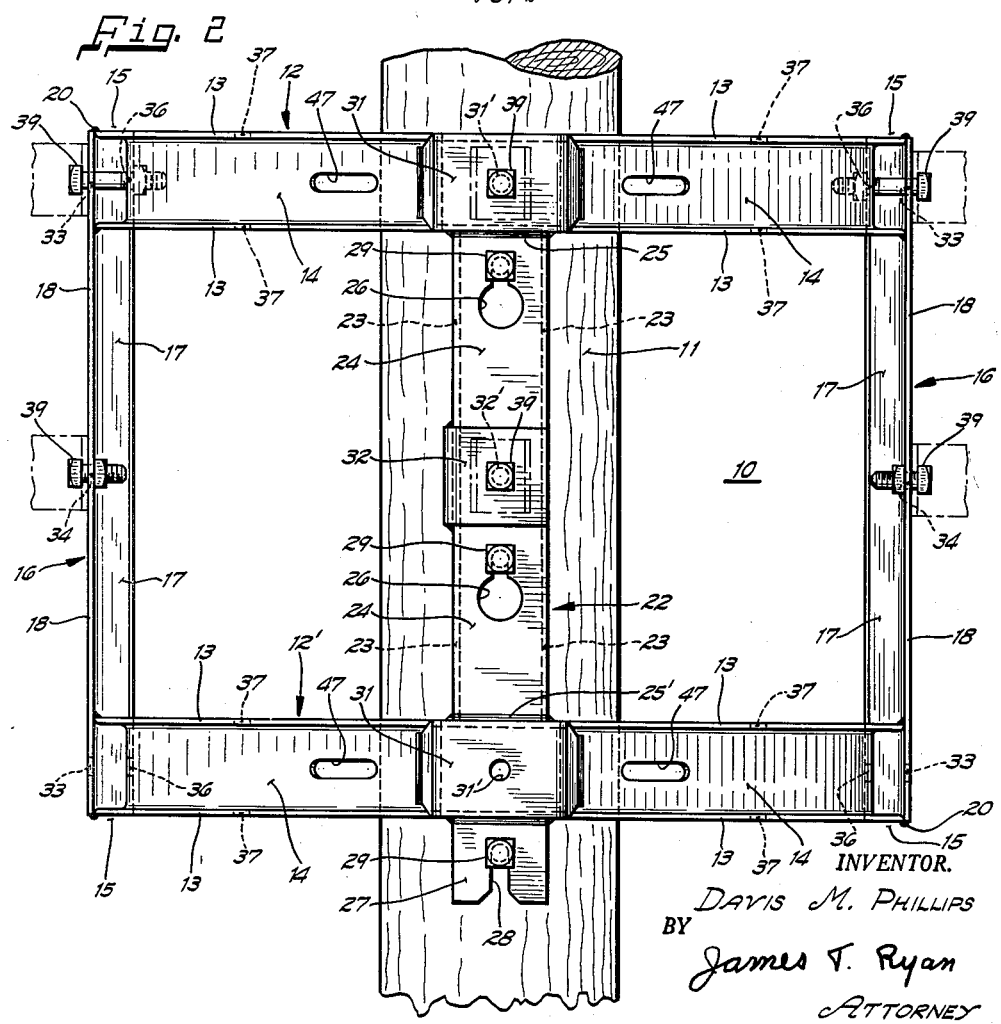
INVENTOR.
DAVIS M. PHILLIPS
BY James T. Ryan
ATTORNEY

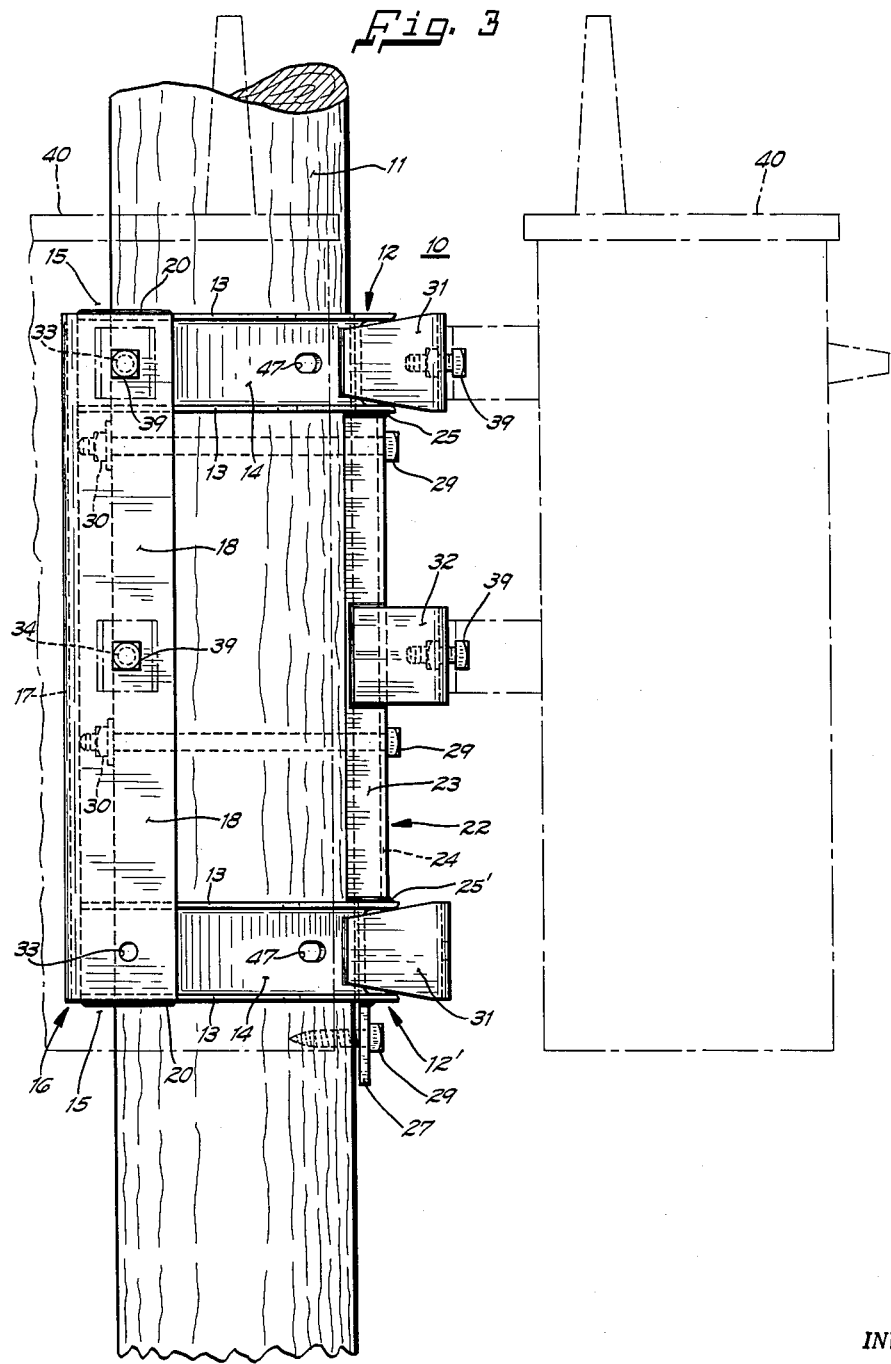

June 27, 1961  D. M. PHILLIPS  2,990,151
SUPPORT FOR ELECTRICAL DEVICES
Filed Nov. 4, 1960  3 Sheets-Sheet 3
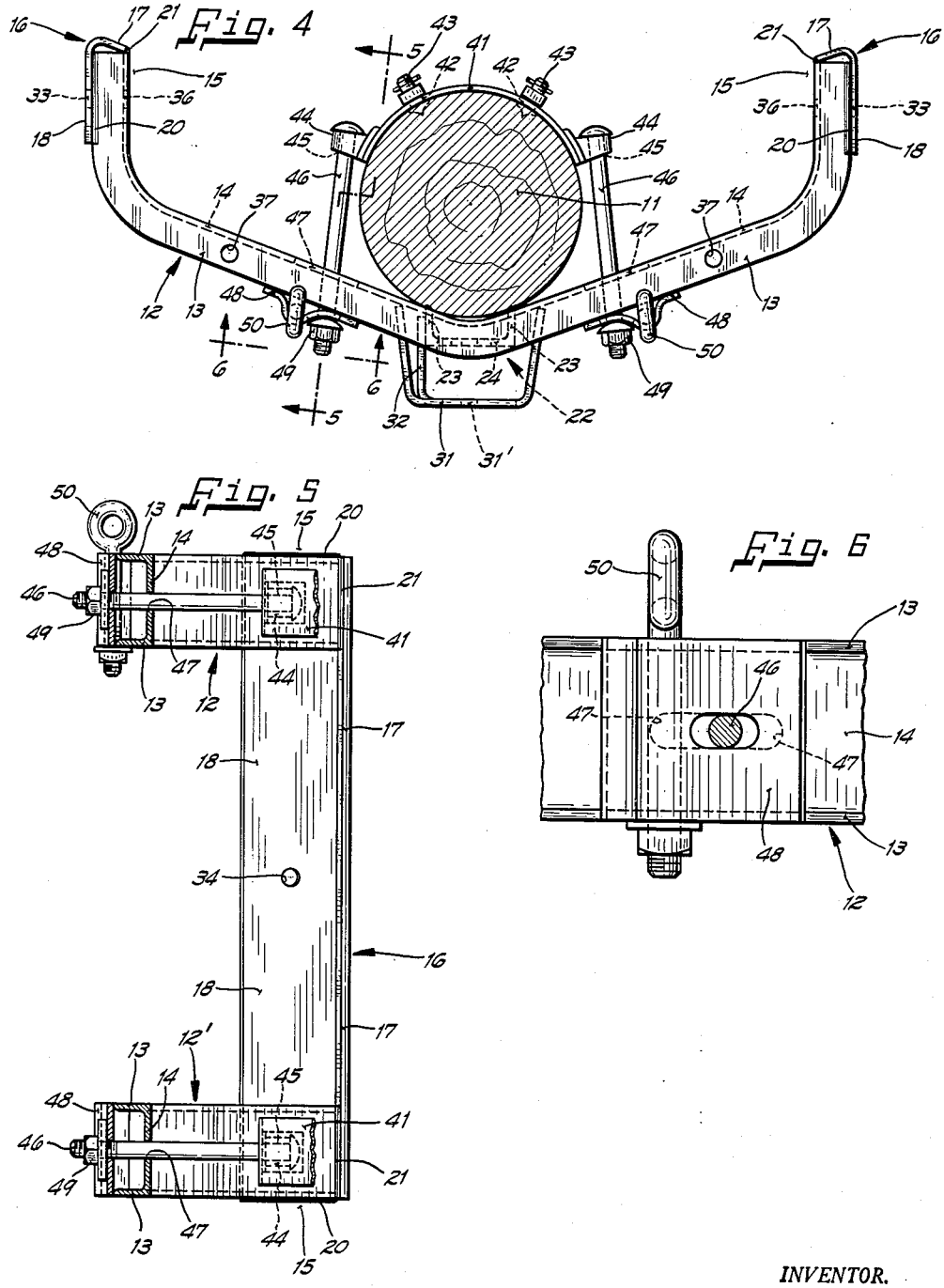
INVENTOR.
DAVIS M. PHILLIPS
BY
James T Ryan
ATTORNEY

United States Patent Office 2,990,151
Patented June 27, 1961

---

2,990,151
SUPPORT FOR ELECTRICAL DEVICES
Davis M. Phillips, South Milwaukee, Wis., assignor to McGraw-Edison Company, Milwaukee, Wis., a corporation of Delaware
Filed Nov. 4, 1960, Ser. No. 67,302
6 Claims. (Cl. 248—221)

This invention relates generally to a support for electrical devices and in particular to a support for mounting a plurality of distribution transformers or electrical capacitors at an elevated position on a pole or similar structure.

Distribution transformers and capacitors are normally mounted at elevated locations on utility poles and the like and constitute relatively expensive pieces of equipment that can be severely damaged should they break loose from their aerial mountings. Hence, a great deal of care is necessary in designing supports for equipment of this type since the structural failure of the support may result in damaged or demolished equipment to the extent of many hundreds and even thousands of dollars.

Prior art devices in attempting to achieve structural strength in these supports have utilized large cumbersome structural members which greatly increase the cost of the support. In addition, many of the prior art devices involve frameworks of a plurality of structural pieces which have to be bolted together either before or after installation of the support on the pole. These latter devices utilizing bolted together structural members are structurally weakened by the bolted connections and are time consuming and expensive to install and remove from the pole.

Many prior art devices are so constructed that a different supporting unit is required for each size of electrical apparatus. Another difficulty involved with some prior art devices is that they may be attached or mounted to a pole or other member only in a single manner. These features seriously impair the versatility of these prior art devices.

It is therefore an object of this invention to provide a simple and economical support for mounting electrical apparatus at an elevated location on a pole or similar member.

Another object of this invention is to provide a unitary supporting structure that may be easily attached to, and detached from, a pole or other member.

A further object of this invention is to provide a supporting structure for electrical apparatus which has increased strength and which permits a relatively equal distribution of load throughout the structure.

A further object of this invention is to provide a supporting structure for electrical apparatus which is capable of supporting a variety of sizes of electrical apparatus with little or no modification of the structure required.

A still further object is to provide a supporting structure for spacedly supporting a plurality of electrical devices at an elevated location on a pole or similar member.

A further object is to provide an electrical apparatus supporting structure which may be attached to a pole or similar member in a variety of manners.

Other objects and advantages of my invention will be apparent from the following description of the preferred embodiments of the invention taken in connection with the accompanying drawings in which:

FIG. 1 is a plan view of the invention in conjunction with a pole member;

FIG. 2 is a view in frontal elevation of the invention in conjunction with a pole member;

FIG. 3 is a view in side elevation of the invention in conjunction with supported electrical apparatus;

FIG. 4 is a plan view of the invention mounted on a pole via a pole band;

FIG. 5 is a view of the invention taken along the lines 5—5 of FIG. 4; and

FIG. 6 is a view of the invention taken along the lines 6—6 of FIG. 4.

Referring now to FIGS. 1–3, 10 indicates the support generally and 11 the utility pole or similar structure to which the support is attached.

The support 10 comprises vertically spaced, formed, arm-like, one piece channel members 12 and 12' both of which have flanges 13 and a web portion 14 therebetween. The web 14 near the center of members 12 and 12' is adapted to be in contact with pole 11 while the ends 15 of the members 12 and 12' are adapted to be in spaced embracing relation to the pole. The ends 15 of member 12 are joined to the ends of the other formed member 12' by means of L-shaped angle members 16 having a short leg 17 and a longer leg 18, which legs for example may be at an oblique angle to one another. The longer leg 18 contacts flanges 13 of the members 12 and 12' and is attached thereto by means of a weld 20. The ends of the other leg 17 of L-shaped angle member 16 are affixed to web 14 of the formed members 12 and 12' at the ends 15 thereof by weld 21.

A U-shaped vertically extending center channel member 22 having flanges 23 and a web portion 24 therebetween is welded to the centers of formed members 12 and 12' at 25 and 25' respectively, and is adapted to have the flanges 23 grip spaced apart portions of the periphery of the pole 11. The fact that the flanges 23 normally abut against the periphery of the pole member aids the structure in withstanding torsional loadings such as may occur during high wind conditions.

A plurality of keyhole slots 26 are also provided in the web 24 of member 22 intermediate the ends thereof. At the center of member 12' and extending downwardly therefrom is an extension member 27 welded to member 12', and having a groove 28 therein.

The purpose of the slots 26 and groove 28 is to fasten the assembly 10 to a pole or similar means 11. This is accomplished by locking previously positioned bolt means 29, which extend thru the center of the pole 11 and which are affixed thereto by means of nuts 30, in the slots 26 and groove 28 as shown particularly in FIG. 2.

Affixed as by welding to the web portion 14 of formed members 12 and 12', near the centers thereof, are raised U-shaped lugs 31 having apertures 31' to which the electrical apparatus 40 (FIG. 3) to be supported is affixed as by bolts to other means 39. Another raised lug 32 which is shown as being L-shaped but which may be similarly configured to lugs 31 has an aperture 32' in one leg thereof and is welded along the other leg to one of the flanges 23 of center channel member 22 intermediate the ends thereof.

Two points of attachment between the electrical apparatus to be supported and the support are generally sufficient. However, by providing three possible points of support (31, 32, 31) different size pieces of electrical apparatus may be accommodated on a given support without the necessity of modifying the support. For example, a smaller electrical device may be mounted on one lug 31 and lug 32. Should a larger size device be needed to replace the smaller device all that has to be done is to remove the smaller device and mount the larger device on both lugs 31. As is evident no modification of the support is required. Lug members 31 and 32 are provided mainly to avoid difficulties involved in attaching the electrical apparatus directly to the center channel member 22 or to the formed channel members 12 and 12'. In addition, the lugs also impart increased strength to the structure.

Apertures 33 and 34 may be provided in leg 18 of L-shaped members 16 for receiving bolts 39 or other holding means which are utilized to affix the electrical apparatus to the member 16. In the web of members 12 and 12' adjacent the apertures 33 in member 16 are provided apertures 36 which are adapted to receive apparatus holding means 39 so that the weight of the supported apparatus is distributed between the formed members (12 and 12') and the members 16.

Apertures 37 in flanges 13 of members 12 and 12', as shown in FIGS. 1 and 4 may also be provided. These apertures may be utilized to anchor additional bracing to the assembly. The other end of the bracing would normally be rigidly affixed to the pole or similar member 11. However, the bracing is not shown in order to shorten the disclosure and to facilitate the understanding thereof. If bracing is not utilized these apertures may be used to support standard insulator pins for safer and neater training of transformer lead wires.

When it becomes necessary to position a piece of electrical apparatus at an elevated location on a pole thru bolts 29 are driven thru the center of the pole and anchored thereto by nuts 30. The nuts are drawn up on the bolts in such a manner that a small portion of the bolt including the head protrude from the circumference of the pole.

Meanwhile at ground level one, two, or three pieces of electrical equipment are affixed as by means 39 to the formed members 12 and 12' and to U-shaped center channel member 22 and/or the side members 16. Once these pieces of electrical equipment are affixed to the assembly 10, it, and the equipment, may be raised to a level adjacent the thru bolts 29. The keyhole slots 26 and/or groove 28 may then be slipped over the heads of the respective bolts and locked in place thereby fixedly attaching the support to the pole.

While a relatively perfectly balanced supporting structure results when three pieces of electrical apparatus of equal weight are positioned on the support, one or two pieces of equipment may be located at the elevated position with substantially the same facility; the structure supporting these unbalanced "loads" without difficulty.

As can be seen my structure results in an especially strong support for electrical devices which is of integral welded design and which is inexpensive to produce, simple to install and which allows a considerable amount of space adjacent the so supported equipment to afford adequate climbing room on the pole.

Referring now to FIGS. 4–6 there is shown an assembly similar to that of FIGS. 1–3 but mounted on a pole or other member 11 as by a pole band assembly.

As can be seen a pole band 41 of curvate configuration extends along a portion of the periphery of the pole on that side of the pole opposite the area of contact between the pole and U-shaped central channel member 22. Apertures 42 may be provided in the pole band 41 to accommodate pointed members 43 which upon turning are capable of digging into the periphery of the pole 11.

Near the ends of the pole band member 41 are two integral ears 44 having apertures 45 therein which are adapted to receive band bolts 46. Positioned in line with the apertures 45 are slots 47 in formed members 12 and 12' (in the web 14). Normally a pole bolt 46 is passed through ears 44 and slots 47 on members 12 and 12' and thru a washer-like member 48 which bears upon the flanges 13 of members 12 and 12'. It can thusly be seen that tightening nuts 49 on bolts 46 will accomplish fixture of the support to the pole.

The washer like member 48, upon tightening of nuts 49 on bolts 46, is drawn up against the flanges 13 of members 12 and 12' and serves to distribute stress normally to both flanges of the member.

A portion of the washer like member 48 may be raised so as to create an aperture between the member and the flanges 13 when the band bolts are tightened. An eye bolt and nut arrangement 50 may be positioned in the aperture thereby serving as a means of lifting the support 10 to an elevated position.

As can be seen my particular supporting assembly is adaptable to a variety of type mounting arrangements with little or no prior modification required.

While two particular embodiments of the invention have been shown and described, it will be obvious to those skilled in the art that various changes and modifications can be made therefrom without departing from the invention and, therefore, it is intended for the appended claims to cover all such changes and modifications as fall within the true spirit and scope of the invention.

I claim:

1. A support for mounting a plurality of electrical devices at an elevated position on a vertical structure comprising, in combination, a plurality of formed channel members spaced one above the other and spacedly embracing said vertical structure, a plurality of substantially vertically extending members welded to the ends of adjacent formed channel members, central channel means welded to adjacent formed channel members intermediate their respective ends, means associated with said central channel means for mounting said support at an elevated position on said vertical structure, and means associated with each of said vertically extending members and said formed channel member and said central channel member for supporting a plurality of electrical devices therefrom.

2. A support for mounting one or more electrical devices at an elevated location on a pole comprising, in combination, a plurality of one piece channel members spaced one above the other and spacedly embracing said pole, a plurality of vertically extending angle members welded to the ends of adjacent one piece channel members, a central channel member welded to adjacent one piece channel members intermediate their respective ends, means associated with said central channel member for mounting said support at an elevated location on said pole, and means associated with each of said angle members and said one piece and central channel members for supporting a plurality of electrical devices in substantially parallel relation therefrom.

3. A support for mounting one or more electrical devices on a utility pole comprising, in combination, spaced apart formed channel members, vertically extending members affixed to the ends of said formed channel members, a central channel disposed between said vertically extending members and affixed to each of said formed channel members intermediate the ends thereof, means associated with said central channel for mounting said support on a utility pole, and means on said vertically extending members and on said formed and central channel members for supporting one or more electrical devices in spaced relation to one another.

4. A support for mounting one or more electrical devices on a pole comprising, in combination, spaced apart formed channel members spacedly embracing said pole, vertically extending members affixed to the ends of adjacent formed channel members, said vertically extending members having portions thereof which are oblique to one another, a central channel member disposed between said vertically extending members and affixed to adjacent formed channel members intermediate their ends, said central channel member normally adapted to engage spaced apart portions of the periphery of said pole, means associated with said central channel member for mounting said support at an elevated location on said pole, and means on said vertically extending members, and on said formed and central channel members for affixing a plurality of electrical devices thereto.

5. A support for mounting one or more electrical devices on an upright pole comprising, in combination, vertically spaced apart one piece channel members spacedly embracing said pole, vertically extending L-shape members affixed to the ends of adjacent one piece channel members, a central channel member disposed between said L-shape members and affixed to adjacent one piece channel members at a point intermediate the ends of said one piece channel members, means associated with said central channel member for mounting said support at an elevated location on said pole, axially aligned first means on said one-piece channel members and on said central channel member for supporting an electrical device therefrom, and second means associated with each of said L-shape members for supporting additional electrical devices therefrom.

6. A support for mounting a plurality of electrical devices at an elevated position on an upright structure comprising, in combination, a plurality of formed channel members spaced one above the other and spacedly embracing said upright structure, a plurality of substantially vertically extending members affixed to the ends of said formed channel members, a central channel member disposed between said vertically extending members and affixed to said formed channel members intermediate the ends thereof, means adapted to engage said upright structure and affixed to said formed channel members for mounting said support on said upright structure, and means on said vertically extending members and on said formed and central channel members for supporting one or more electrical devices in spaced relation to one another.

References Cited in the file of this patent

UNITED STATES PATENTS

| | | |
|---|---|---|
| 1,749,252 | LeBlond | Mar. 4, 1930 |
| 2,175,778 | MacKinnon | Oct. 10, 1939 |
| 2,883,135 | Smalley | Apr. 21, 1959 |
| 2,970,800 | Smalley | Feb. 7, 1961 |